JOHN P. SAUNDERS
HERBERT K. DICK
ARMAND L. TARDIFF
INVENTORS

ATTORNEY

JOHN P. SAUNDERS
HERBERT K. DICK
ARMAND L. TARDIFF
INVENTORS

Aug. 17, 1965    J. P. SAUNDERS ETAL    3,200,965
FILAMENT TRANSFER APPARATUS
Filed Oct. 24, 1962    9 Sheets-Sheet 4
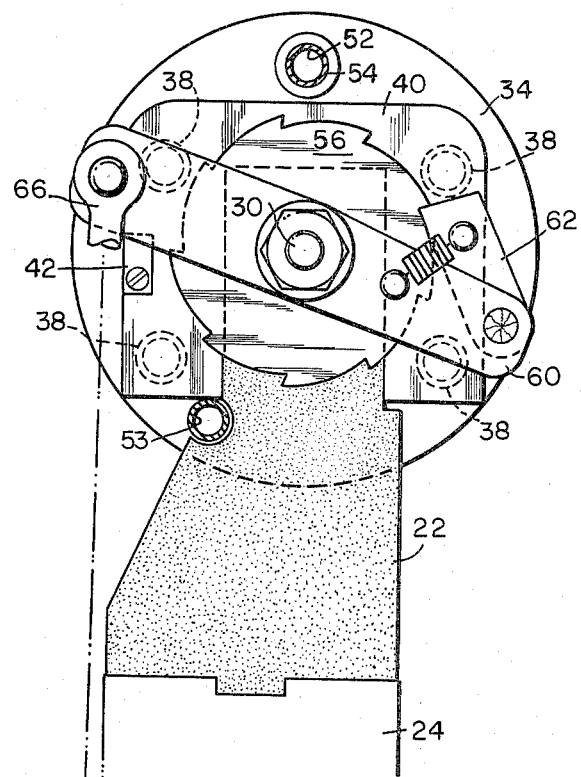
FIG. 4
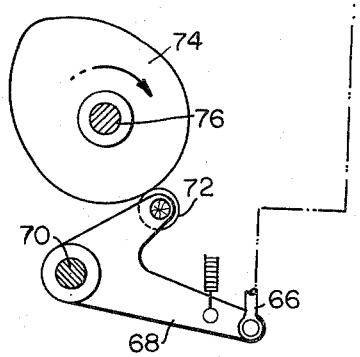
JOHN P. SAUNDERS
HERBERT K. DICK
ARMAND L. TARDIFF
        INVENTORS
BY *Joseph C. Ryan*
        ATTORNEY

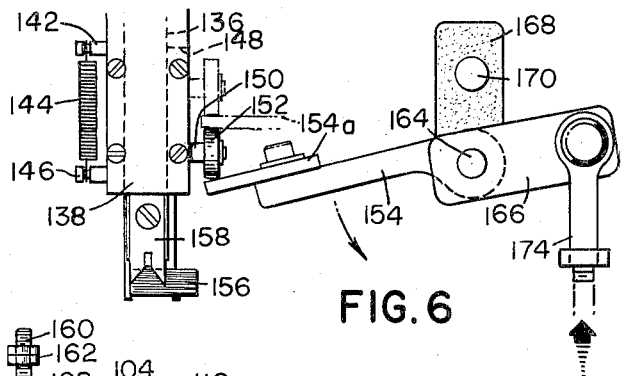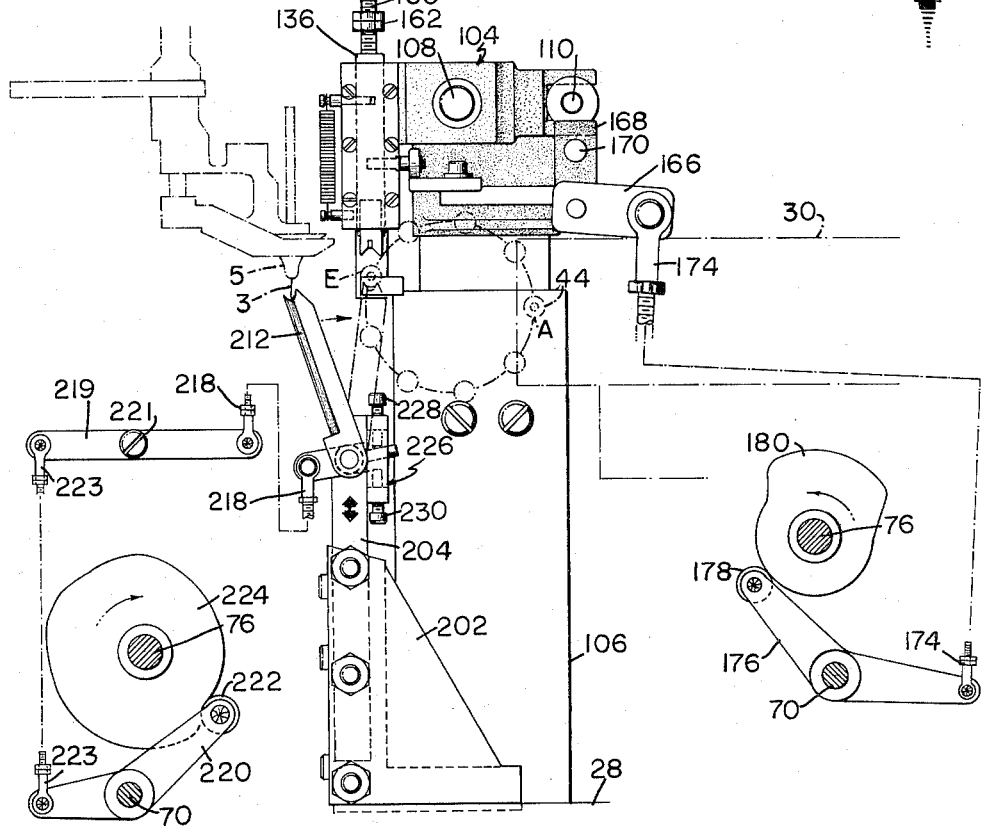

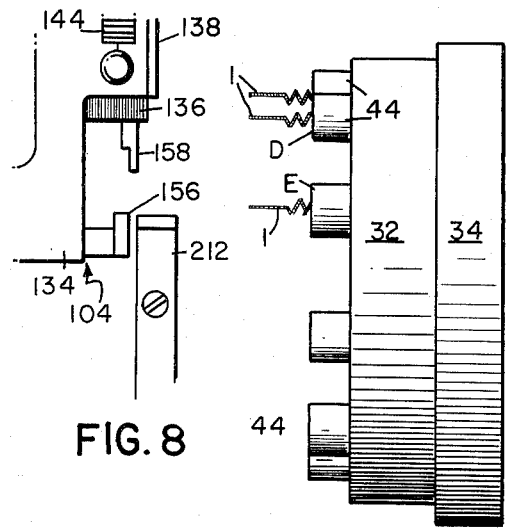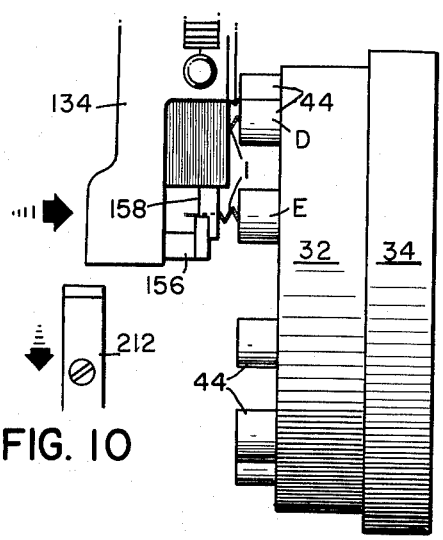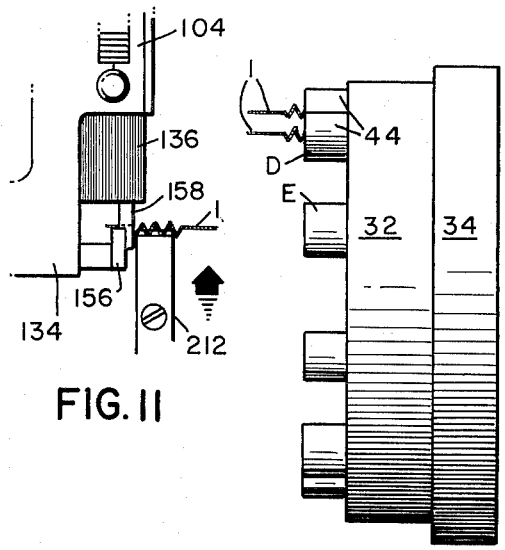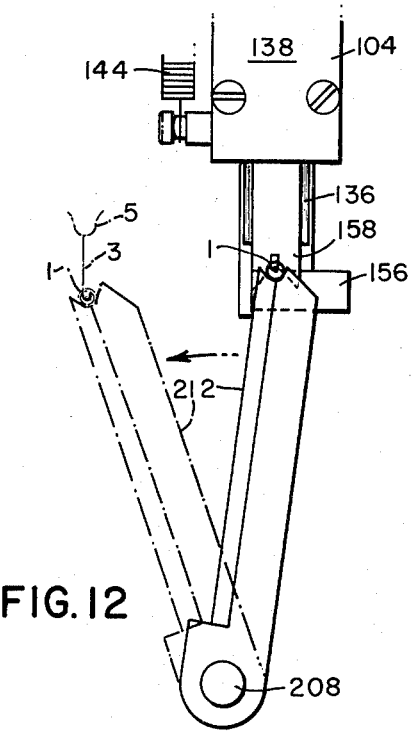

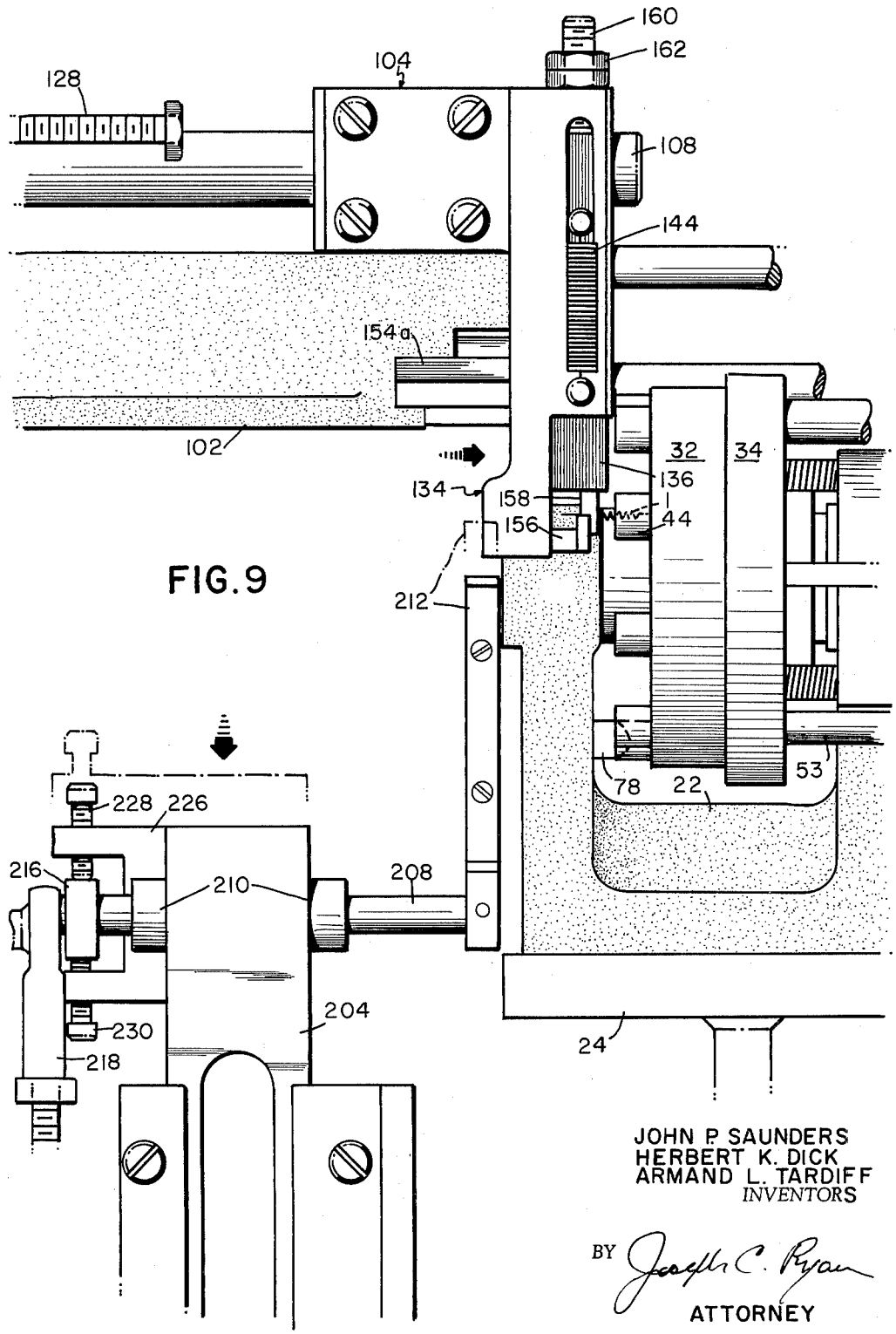

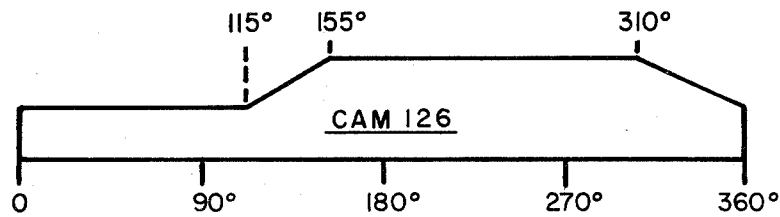
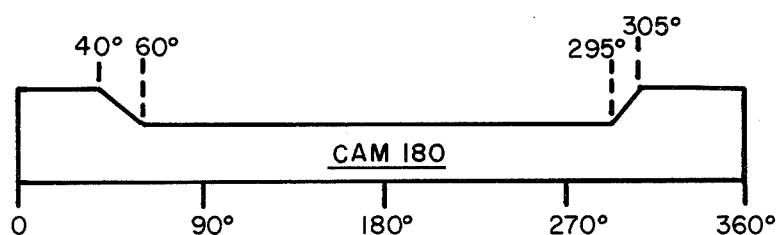
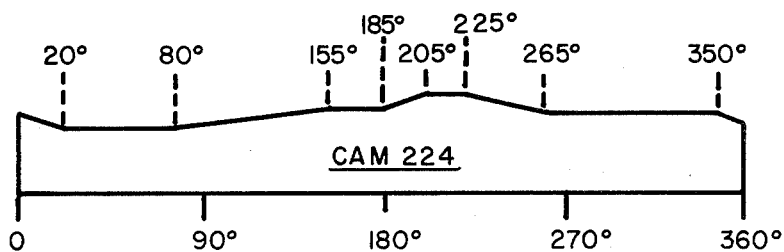
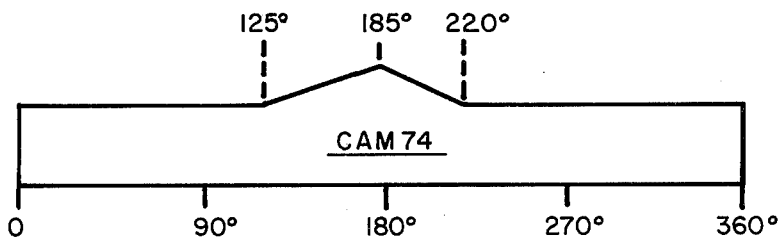
FIG. 13

3,200,965
FILAMENT TRANSFER APPARATUS
John P. Saunders, Danvers, Herbert K. Dick, Lynnfield, and Armand L. Tardiff, Salem, Mass., assignors to Sylvania Electric Products Inc., a corporation of Delaware
Filed Oct. 24, 1962, Ser. No. 232,723
3 Claims. (Cl. 214—1)

This invention relates to the manufacture of electric lamps and the like, and more particularly to the automatic feeding of filaments to the lead-in wires of a lamp stem during the lamp manufacturing operations.

In the manufacture of electric lamps, a flare, an exhaust tube and a pair of lead-in wires are assembled to define a unitary structure generally called a lamp stem. An apparatus for performing this operation automatically is shown and described in U.S. Patent 2,637,144, entitled "Automatic Lamp Stem Fabricating Apparatus," which issued on May 5, 1953, to R. M. Gardner et al. After the lamp stem has been made a filament is secured to the lead-in wires to provide a unitary structure generally called a lamp mount. The apparatus shown in the referenced patent may be and usually is provided with a filament mounting station located at a point along the path traversed during an operating cycle thereof between the station at which the last stem manufacturing operation is performed and the finished article discharge station. One of the more commonly used means employed to present a filament to the lead-in wires of a lamp stem at the filament mounting station is a vacuum transfer finger which is caused to oscillate between a filament-receiving locus and a filament-delivery locus, the latter being the presentation of the filament to the lead-in wires of the stem for affixation thereto.

One of the more difficult problems over the years in the manufacture of electric lamps has been the provision of satisfactory means for delivering a filament to a transfer device, such as the aforesaid vacuum transfer finger for example. Because of the nature and sequence of the operations involved in the forming and shaping of lamp filaments, they are usually delivered to the filament mounting area in lots of several hundred in randomly oriented array. Thus a condition precedent to filament mounting is the disentanglement of these filaments from one another and the orderly, sequential movement to a discharge locus. Vibratory feeder bowls, of the type shown in U.S. Patent 2,760,679 which issued on August 28, 1956, for example, have been employed successfully in performing this operation automatically. Although these feeders effect the disentanglement of the filaments from one another and the orderly, sequential movement thereof to a discharge locus, there remains the problem of conveying these filaments in an orderly, controlled manner to the means employed to present them to the lead-in wires of lamp stems. It is the solution of this problem to which this invention is directed.

In accordance with the principles of this invention, a novel valve assembly is provided wherein the movable plate thereof serves also as a head-carrying drum which is indexed through a plurality of stations including a filament receiving station and a filament discharge station. The filament receiving station is aligned with the discharge point of a filament feeding apparatus so that a head on the drum can receive a filament therefrom. A vacuum system associated with the valve assembly draws a filament end-on into the head and holds it therein during indexing through a plurality of stations to the filament discharge station. At the filament discharge station of the drum, a reciprocative transfer apparatus withdraws the filament from the head of the drum and delivers it to the vacuum transfer finger of a filament delivery assembly for presentation to the lead-in wires of a lamp stem.

In the specific embodiment of the apparatus of this invention illustrated in the accompanying drawings, FIGURE 1 is a plan view of a specific embodiment of the apparatus of this invention, showing its relationship to a filament feeding apparatus which feeds filaments thereto and a mount machine which receives filaments therefrom.

FIGURE 4 is an end elevational view of the filament pickup assembly showing the drive thereof.

FIGURE 5 is an end elevational view of the apparatus of FIGS. 1 and 2, illustrating particularly the drives associated with the filament transfer assembly and the filament delivery assembly. A fragmentary showing, in phantom, of a head of a mount machine is also illustrated in this figure to depict the relationship thereto of a filament-carrying finger of the filament delivery assembly.

FIGURE 6 is a fragmentary detail of a portion of the filament transfer assembly, showing particularly the means employed to locate and grip the leg of a filament during the transfer operation and the means employed to actuate this filament gripping means.

FIGURE 8 is a fragmentary detail of the key components illustrated in FIG. 7, showing them in their rest positions.

FIGURE 9 is a fragmentary detail on an enlarged scale of these same components and some of the mechanisms associated therewith showing the filament transfer assembly in its advanced position to receive a filament from the filament pickup assembly, and the filament delivery assembly in a retracted position with respect thereto.

FIGURE 10 is a fragmentary detail of the key components illustrated in FIG. 8 and showing the finger of the filament delivery assembly retracted and the filament transfer assembly advanced into filament-receiving position with respect to the filament-carrying heads of the filament pickup assembly.

FIGURE 11 is a fragmentary detail of the key components illustrated in FIGS. 8 and 10, showing the filament transfer assembly retracted and the finger of the filament delivery assembly advanced to receive a filament therefrom.

FIGURE 12 is a fragmentary detail of the key components of the filament transfer assembly and the filament delivery assembly. The finger of the filament transfer assembly is shown in solid in its filament-receiving position and in phantom in its filament-delivery position, presenting a filament to the lead-in wires of a lamp mount.

FIGURE 13 is a developed cam chart illustrating the operating cycle of the cams associated with the filament pickup assembly, the filament transfer assembly and the filament delivery assembly.

Filament pick-up assembly

Figure 1:
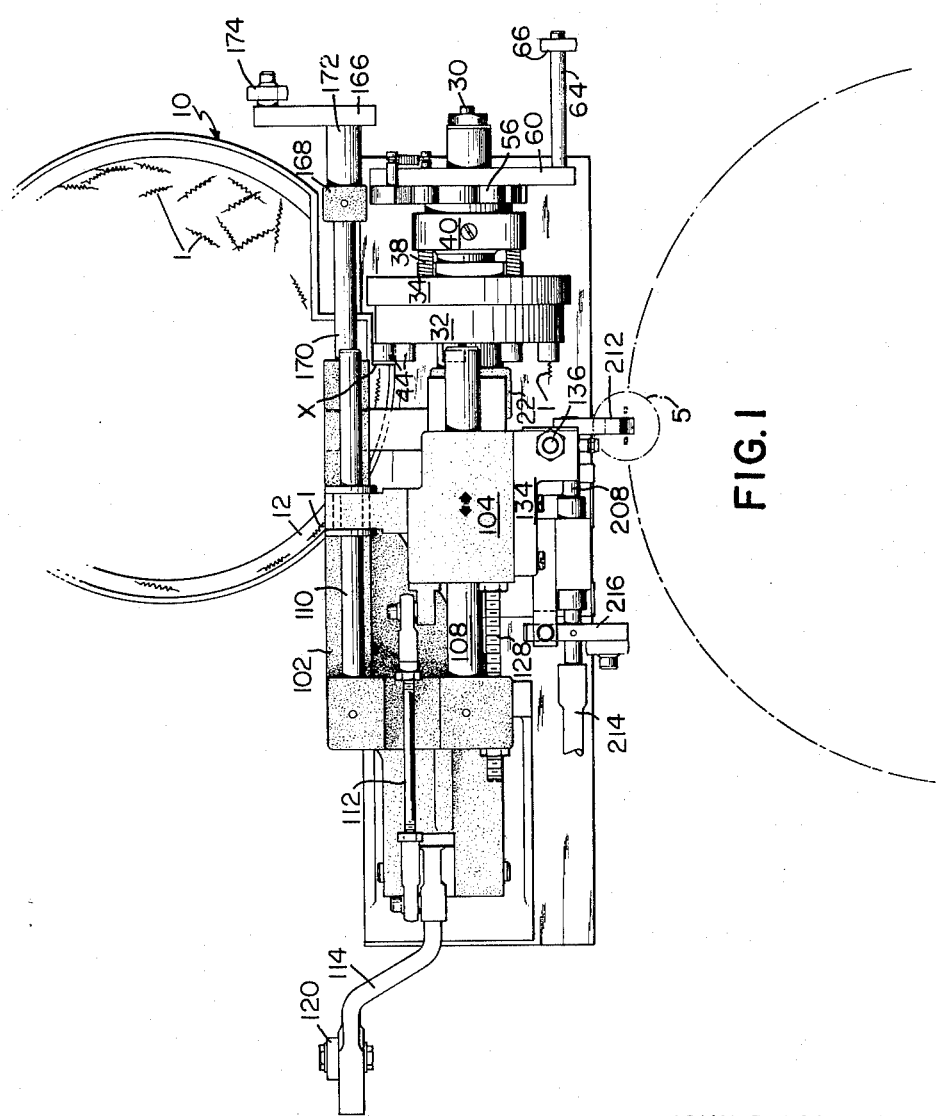
Figure 2:
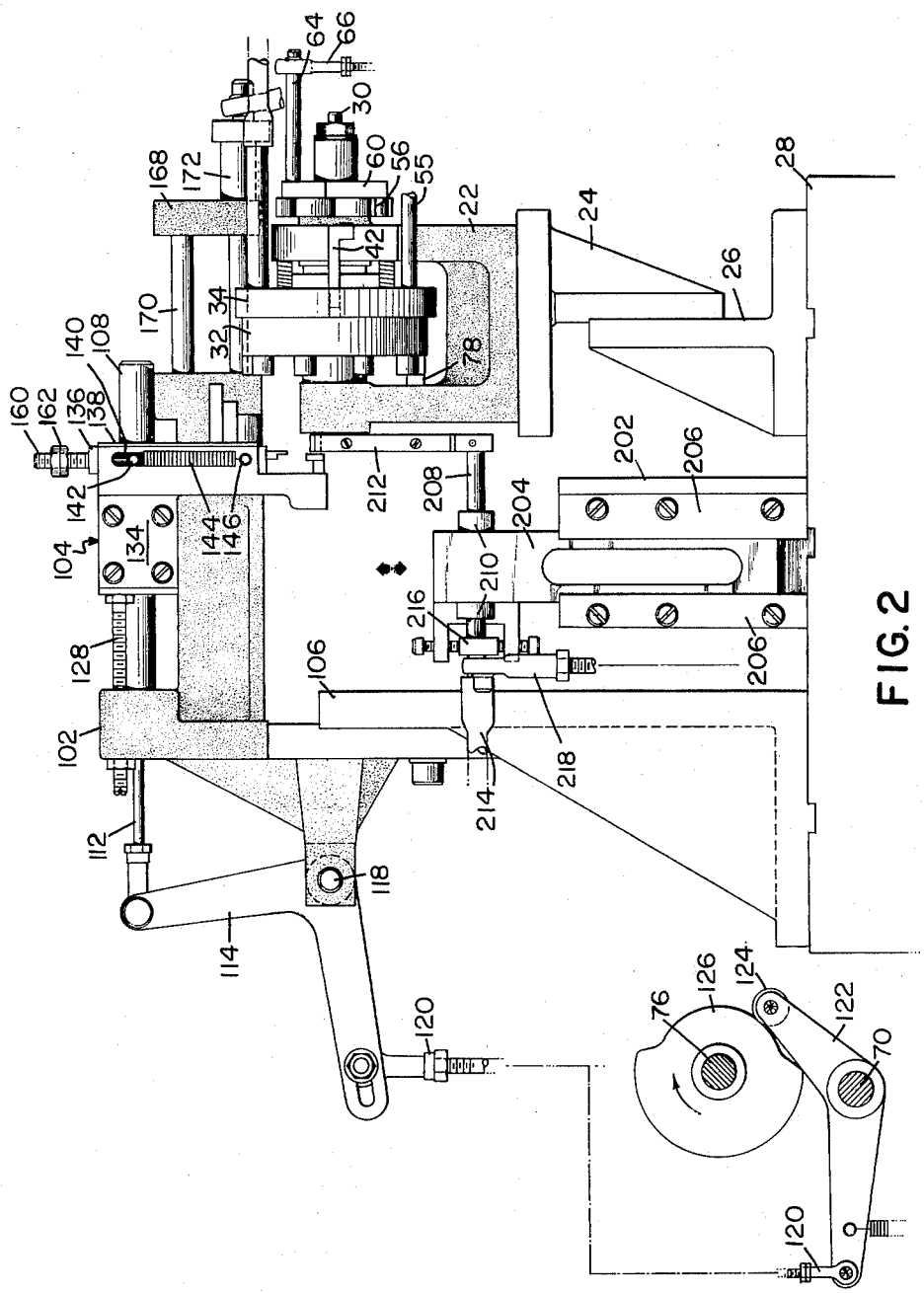
FIGURE 2 is a side elevational view of the apparatus of FIG. 1.
Figure 3:
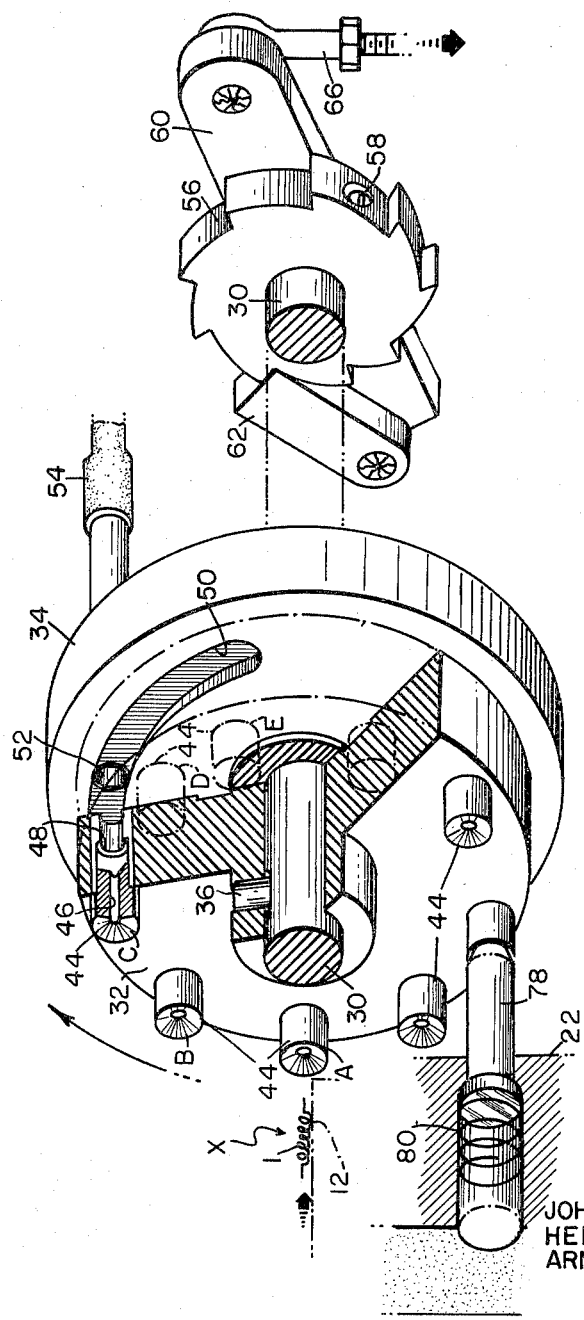
FIGURE 3 is an exploded detail, on an enlarged scale and partly in section, of the head-drum-valve components of the filament pickup assembly and the indexing means associated therewith.

The filament pick-up assembly will now be described, reference being made primarily to FIGS. 1–4. As shown best in FIG. 2, the base member 22 of the filament pick-up assembly is a substantially U-shaped casting mounted on a bracket 24 which is in turn adjustably mounted on a bracket 26 mounted on table 28. A drum shaft 30 extends through and is rotatably supported within the legs of the base member 22. A valve assembly comprising a drum 32 and a valve plate 34, hereinafter referred to as the valve, are disposed on the drum shaft 30 between the legs of the base member 22, the former being secured to the shaft 30 by pin 36 as shown in FIG. 3. The valve 34 is maintained in firm frictional engagement with the drum 32 by compression springs 38 and bearing plate 40. The bearing plate 40 is fixedly mounted on one of the legs of the base member 22. The bearing plate 40 and the valve 34 are provided with aligned pairs of pockets within which the ends of the springs 38 are seated. Although the valve 34 is disposed on the drum shaft 30, it does not rotate therewith, a key 42 being provided for this purpose. The key 42 is fitted in slots provided therefor in the bearing plate 40 and the valve 34.

As best shown in FIG. 3, the drum 32 is provided with a plurality of filament-carrying heads 44 for receiving filaments and carrying them to a discharge locus. Each of the heads 44 is provided with a central bore 46 in register with a port 48 which extends through to the opposite face of the drum 32. As will be described in more detail below, each of the heads 44 is in communication with an elongated arcuate slot 50, formed in a face of the valve 34, during a portion of the revolution of the drum 32. A bore 52 in the valve 34 connects the slot 50 to a vacuum line 54. This arrangement provides a means for holding filaments in the heads 44 during the filament transfer operation effected by the drum 32. The valve 34 is also provided with a bore 53 (FIG. 4) connected to an air pressure line 55 (FIG. 2) for clearing the heads 44. The bore 53 is in register with one of the dwell positions of the heads 44 after discharge of a filament therefrom has normally been effected. A blast of air therethrough clears the head if a filament has not been discharged therefrom due to some malfunction. This blast of air will also dislodge and effect removal of any foreign material and thus insure a clear head for the next filament pick-up and transfer cycle.

Rotation of the drum shaft 30 and the drum 32 secured thereto to advance the filament carrying heads 44 through their operating cycle is effected by a pawl and ratchet mechanism. As shown in FIG. 3, a ratchet 56 is secured to the drum shaft 30 by pin 58. A drive lever 60 is supported intermediate its ends on the drum shaft 30 but is not secured thereto. A pawl 62 is mounted on one end of the drive lever 60 and engages the ratchet 56. As best shown in FIGS. 1 and 2, a spacer rod 64 is secured to and projects from the other end of the drive lever 60. One end of a connecting rod 66 is connected to the outer end of the spacer rod 64. As shown in FIG. 4, the other end of this connecting rod 66 is connected to one end of a rocker arm 68. The rocker arm 68 is secured intermediate its ends on a rocker arm shaft 70. The other end of the rocker arm 68 is provided with a cam follower 72 which rides on a cam 74 on cam shaft 76. Thus the drum shaft 30 is actuated by the cam 74 through the connecting rod 66, drive lever 60, pawl 62 and ratchet 56 which is secured to the drum shaft. Since the drum 32 is pinned to the drum shaft 30, the filament-carrying heads 44 on the drum 32 are advanced in a series of steps during each revolution of the drum shaft 30. During each indexing step, an index pin engages one of the heads 44 and holds it securely during each dwell. As best shown in FIG. 3, the index pin 78, loaded by spring 80, is disposed in a counter-sunk well in one of the legs of the substantially U-shaped base member 22.

Filament transfer assembly

The filament transfer assembly will now be described with reference being made particularly to FIGS. 1, 2, 5 and 6. The base member 102 of the filament transfer assembly is a casting on which a transfer slide 104 is supported for reciprocative movement. The base member 102 is mounted on bracket 106 on the table 28. The transfer slide 104 is reciprocatively supported on a pair of spaced guide rods 108 and 110 which are fixedly mounted in and project from the base member 102. As shown particularly in FIGS. 1 and 2, one end of a connecting rod 112 is connected to the transfer slide 104. The other end of the connecting rod 112 is connected to one end of a bell-crank lever 114. As shown in FIG. 2, the bell-crank lever 114 is pivotally mounted intermediate its ends at 118 in base member 102. A connecting rod 120 connects the other end of the bell-crank lever 114 to one end of a rocker arm 122 mounted intermediate its ends on rocker arm shaft 70. The other end of the rocker arm 122 is provided with a cam follower 124 which rides on cam 126 on cam shaft 76. Thus reciprocation of the transfer slide 104 on the guide rods 108 and 110 is effected by the cam 126 through connecting rod 120, bell-crank lever 114 and connecting rod 112. A stop, consisting of a threaded bolt 128 extending through the base member 102, defines the rearward limit of the stroke of the transfer slide 104.

A bracket 134, as best shown in FIG. 2, is attached to a side face of the transfer slide 104. The bracket 134 has a channel formed therein to receive a pick-up slide 136 which is reciprocatively disposed therein. A cover 138 is attached to the bracket 134 and encloses the pick-up slide 136. As best shown in FIG. 2, one face of the bracket 134 is provided with an elongated slot 140 within which a spring pin 142 rides, the spring pin 142 is being affixed to and projecting laterally from the pick-up slide 136. One end of an extension spring 144 is connected to the pin 142 and the other end of the spring 144 is connected to a spring pin 146 secured to and projecting laterally from the bracket 134. As best shown in FIG. 6, the opposite face of the bracket 134 is also provided with an elongated slot 148 within which a pin 150, attached to and projecting laterally from the pick-up slide 136, rides. The outer end of the pin 150 is provided with a roller 152 which rides on the lateral extension 154a of a cam lever 154.

The lower extremity of the bracket 134 is provided with a laterally extending jaw 156. A jaw 158 is secured to and is depending from the lower end of the pick-up slide 136 as best shown in FIG. 6. The jaw 158 is moved into and out of operative relationship with respect to the jaw 156 by reciprocation of the pick-up slide 136 within the bracket 134. A threaded stud 160, fitted into the top of pick-up slide 136 and provided with stop nuts 162, limits the downward stroke of the pick-up slide 136 within the bracket 134.

The means employed to effect reciprocation of the pick-up slide 136 will now be described with reference being made particularly to FIGS. 5 and 6. As was mentioned above, roller 152 on pin 150 projecting from pick-up slide 136 rides on lateral extension 154a of cam lever 154. The cam lever 154 is pinned to a lever shaft 164 near the inner end thereof. Another cam lever 166 is pinned to the lever shaft 164 near the other end thereof. The lever shaft 164 is rotatably supported at its inner end in the base member 102. The lever shaft 164 extends through and is rotatable in the lower end of a tie block 168. The tie block 168 is mounted on an end of a support rod 170 which is fitted in and projects laterally from the base member 102. A spacer sleeve 172, concentric with the lever shaft 164, is disposed between the tie block 168 and the cam lever 166. As is illustrated in FIG. 5, a connecting rod 174 connects the cam lever 166 to a rocker arm 176 mounted on rocker arm shaft 70. A cam follower 178 supported on rocker arm 176 rides on cam 180 on cam shaft 76. Thus, reciprocation of the pick-up slide 136 to move the jaw 158 depending therefrom into and out of cooperative relationship with respect to the jaw 156 etxending laterally from the lower extremity of the bracket 134 is effected by the cam 180 through connecting rod 174, cam lever 166, lever shaft 164 and cam lever 154 and its lateral extension 154a to displace the roller 152 which rides on said lateral extension 154a.

*Filament delivery assembly*

The filament delivery assembly will now be described with reference being made particularly to FIGS. 2 and 5. The base member of the filament delivery assembly is a bracket 202 mounted on the table 28. The bracket 202 is provided with a channel within which a slide 204 is disposed. Cover plates 206 secured to the bracket 202 retain the slide 204 within the bracket. A hollow shaft 208 extends through the upper end of the slide 204 and is rotatable therein. Lateral displacement of the shaft 208 within the slide 204 is prevented by collars 210 secured to the shaft 208 on opposite sides of the slide 204. A suction filament transfer finger 212 is secured to one end of the hollow shaft 208. A vacuum line 214 is connected to the other end of the hollow shaft 208. The finger 212 is provided with a bore extending along the longitudinal axis thereof in register with an aperture at the tip of the finger and in communication with the hollow shaft 208. A lever 216 is secured intermediate its ends to the hollow shaft 208. One end of a connecting rod 218 is connected to one end of the lever 216. The other end of the connecting rod 218 is connected to one end of a drive lever 219 which is supported intermediate its ends at stationary pivot 221. The other end of the drive lever 219 is connected to a rocker arm 220 by connecting rod 223. The rocker arm 220, which is secured intermediate its ends on rocker arm shaft 70, is provided with a cam follower 222 which rides on cam 224 on cam shaft 76. Thus rotation of the shaft 208, to effect oscillation of the finger 212 mounted thereon, is effected by the cam 224 through connecting rod 223, drive lever 219, connecting rod 218 and lever 216 mounted on the shaft 208.

A bifurcated plate 226 is mounted on the back face of the slide 204 and the bifurcations thereof are provided with stop screws 228 and 230. The stop screws 228 and 230 are aligned with and spaced from one another with the tail of the lever 216 extending therebetween. During one complete revolution of the cam 224, the tail of the lever 216 alternately engages the screws 228 and 230. Oscillation of the finger 212, effected by rotation of the shaft 208 on which it is mounted, is effected during the travel of the tail of the lever 216 between engagement with the stop screw 228 and engagement with the stop screw 230. Reciprocation of the slide 204 is also effected by the cam 224 and this occurs after the tail of the lever 216 has engaged one of the stop screws 228, 230 and thus arrested further rotation of the shaft 208. Further clockwise rotational movement of the drive lever 219 about its pivot 221 after the tail of the lever 216 has engaged stop screw 228 is translated into downward movement of the slide 204 by the connecting rod 218. Further counter-clockwise rotational movement of the drive lever 219 about its pivot 221 after the tail of the lever 216 has engaged stop screw 230 is translated into upward movement of the slide 204 by the connecting rod 218.

*Operation*

Figure 7:
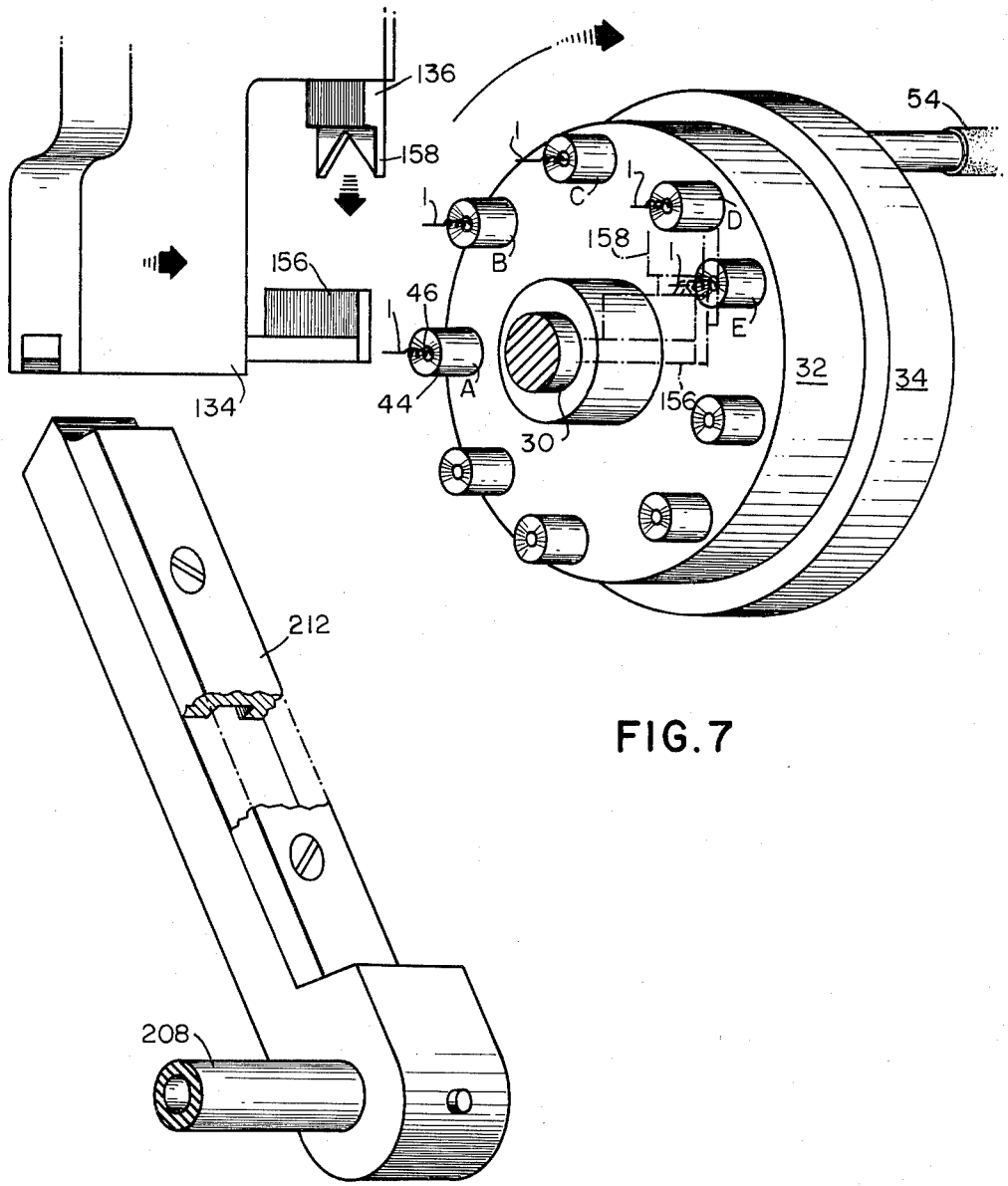
FIGURE 7 is a perspective view on an enlarged scale of the key components of the three main units which comprise the apparatus of this invention, viz., the filament pickup assembly, the filament transfer assembly and the filament delivery assembly.

The operation of the foregoing assembly will now be described with reference being made initially to FIGS. 1 and 7. Filament feeding bowl 10 of a vibratory type filament feeding apparatus such as shown in U.S. Patent 2,760,679 for example is shown in FIG. 1. The vibratory feeder causes filaments 1 to advance along a track 12 of the bowl 10 to a discharge point identified by the letter $x$ in FIGS. 1 and 3. It will be noted that the discharge point $x$ is located immediately adjacent to one of the filament-carrying heads 44 on the drum 32. During each dwell of the drum 32, a head 44 is aligned with the discharge point $x$ and a filament 1 at this discharge point is aligned along the longitudinal axis thereof with the bore 46 of the head 44. This alignment of a filament 1 with respect to a head 44 is illustrated at station A in FIG. 3. As described above in connection with FIG. 3, the valve 34 is provided with an elongated arcuate slot 50 which is in register with ports 48 in the drum 32 and heads 44 from the filament pick-up station A to the filament discharge station E, station A being aligned with one end of the elongated slot 50 and station E being aligned with the other end thereof. A vacuum is drawn through the line 54 to suck a filament 1 end-on from the discharge point $x$ of the track 12 of the bowl 10 and draw it into and hold it in a head 44 of the drum 32 as shown in station A in FIG. 7. During the indexing movement of a filament carrying head 44 from station A to station E the filament 1 is retained in the head 44 as shown in FIG. 7 by the vacuum which is being drawn thereon by the vacuum line 54 through the elongated slot shown in FIG. 3.

In the description of the apparatus set forth above, a filament pick-up assembly, a filament transfer assembly and a filament delivery assembly were described. The relative location of some of the key components of these three assemblies is shown on an enlarged scale in FIG. 7. These same key components are also shown in their respective rest positions in FIG. 8. As shown in FIG. 8, the jaw 158 depending from the slide 136 is retracted with respect to the jaw 156 extending laterally from the bracket 134 and the entire filament transfer assembly is spaced laterally a substantial distance from the drum 32. During indexing of the drum 32 to advance a filament carrying head 44 from station D to station E as shown in FIGS. 7 and 8 for example, the transfer slide 104 of the filament transfer assembly is displaced from the retracted position as shown in FIG. 2 to the advanced position as shown in FIG. 9. During this same indexing period, the pick-up slide 136 with the jaw 158 depending therefrom is displaced from the retracted position as shown in FIG. 2 to the advanced position as shown in FIG. 9 and thus the jaw 158 is caused to close on a leg of filament 1 against the jaw 156 at station E as shown in FIGS. 9 and 10. With a filament 1 now securely gripped by the jaws 156 and 158 of the filament transfer assembly, the slide 104 of the filament transfer assembly is displaced from the advanced position as shown in FIG. 9 to the retracted position as shown in FIG. 2 and carries the filament 1 with it.

During the period when the slide 104 is returning to its retracted position and the jaws 156 and 158 are withdrawing a filament 1 from a head 44 from the FIG. 10 to the FIG. 11 position, the drum 32 indexes one station and the suction transfer finger 212 of the filament delivery assembly is displaced from the FIG. 10 position to the FIG. 11 position placing it in article-receiving relationship with respect to the body of the filament 1. This relative displacement of the finger 212 and its associated parts is also shown in FIG. 9, the finger 212 and its associated parts having been displaced from the solid to the phantom disposition as shown in FIG. 9, this upward movement having been effected by the upward movement of the slide 204.

Since the finger 212 of the filament delivery assembly has moved into engagement with the body of the filament 1, the vacuum drawn on the finger 212 through the hollow shaft 208 and the vacuum line 214 effects a firm positive seating of the filament on the finger. The slide 136 of the filament transfer assembly is then retracted thus freeing the filament from the jaws 156 and 158, and the finger 212 of the filament delivery assembly with the filament 1 securely held at the tip thereof is displaced from the solid position to the phantom position as shown in FIG. 12. This displacement of the finger 212 is effected by rotation of the shaft 208 on which it is mounted. This displacement is also shown from phantom to solid in FIG. 5 wherein the presentation of the filament by the finger to lead-in wires 3 of a lamp stem 5 is illustrated.

Cam operating cycle

FIG. 13 is a developed cam chart illustrating the operating cycle of the cams associated with the filament pick-up assembly, the filament transfer assembly and the filament delivery assembly. An operating cycle of these cams and their relationship to one another will now be described, with reference being made initially to cam 224 of the filament delivery assembly.

Between 155° and 185° on the cam 224, the finger 212 of the filament delivery assembly is disposed as shown in FIG. 5, i.e. fully oscillated to the left. During this dwell, a filament which has been presented to the lead-in wires of a lamp mount is being secured thereto. Between 185° and 205°, the slide 204 of the filament delivery assembly is drawn downwardly and carries the finger 212 with it to clear the lamp mount to which a filament has just been delivered. The period from 205° to 225° is a dwell. From 225° to 265° the finger 212 is oscillated clockwise. The period from 265° to 350° is a dwell. From 350° to 20° the slide 204 is moved upwardly and carries the finger 212 with it to locate the finger 212 in filament-receiving position to receive another filament as show in FIG. 11. The finger 212 receives a new filament during the dwell from 20° to 80°. From 80° to 155°, the finger 212 is displaced from the phantom to the solid position as shown in FIG. 5 to present the new filament to a new lamp mount.

Cam 180 will now be described. This cam controls the operation of the slide 136 of the filament transfer assembly. As described above, the jaw 158 depends from this slide 136 as shown in FIG. 6 and is moved into and out of cooperative relationship with respect to jaw 156 to sequentially grip and release a filament. During the period from 40° to 60°, the cam 180 elevates the slide 136 (FIG. 6) to displace the jaw 158 and release a filament to the finger 212 of the filament delivery assembly. The jaws 156 and 158 remain open with respect to one another from 60° to 295° on the cam 180. From 295° to 305°, the cam 180 actuates the slide 136 to advance the jaw 158 depending therefrom to filament gripping relationship with respect to a filament as shown in FIGS. 9 and 10 for example. During the dwell from 305° to 40°, these jaws are maintained closed with a filament held therebetween.

Cam 126 will now be described. This cam, like cam 180, is also associated with the filament transfer assembly. This cam 126 actuates the transfer slide 104 to effect reciprocation thereof on the rods 108 and 110 (FIG. 1) between the retracted position as shown in FIG. 2 to the advanced position as shown in FIG. 9. This reciprocation of the slide 104 is completed at 360°. From 0° to 115° the slide 104 dwells in the retracted or FIG. 2 position. During this dwell, and as described above, the cam 180 actuates the slide 136 to release a filament from the jaws 156, 158 to finger 212 of the filament delivery assembly. From 115° to 155° the slide 104 is displaced from the retracted position of FIG. 2 to the advanced position of FIG. 9 and remains in this advanced position from 155° to 310°, during which time another filament carrying head 44 on the drum 32 is moved into position to present a filament to the jaws 156, 158.

The drum 32 on which a plurality of filament carrying head 44 are mounted, is indexed by cam 74. Indexing of the drum 32 is effected between 125° and 220° on the cam 74.

What we claim is:

1. A coiled filament transfer apparatus comprising: a valve having a stationary plate and a movable plate, each having an inner and an outer face opposite one another, with the adjacent inner faces being in gas-sealing engagement with one another; a plurality of filament-carrying heads disposed about the outer face of said movable valve plate; means for moving said movable valve plate with respect to said stationary valve plate to advance the heads thereon to a plurality of stations including a filament pickup station and a filament discharge station; means at the pickup station for presenting filaments end on to the heads, and means for drawing a filament into each of said heads and retaining it therein during the travel of each of said heads between said filament pickup station and said filament discharge station, said heads each having a suction port therethrough of a diameter between the diameter of the wire of the coiled filament and the diameter of the coiled portion of the filament.

2. Apparatus for transporting coiled lamp filaments, having a body and a leg extending from each end of said body and substantially parallel to the longitudinal axis thereof, emerging end-on from a filament feeding device, to the lead-in wires of a lamp stem for affixation thereto, said apparatus comprising: a first filament transfer apparatus, disposed in cooperative relationship with respect to said filament feeding device, including a head for receiving a filament from said filament feeding device, means for drawing said filament end-on into said head with a leg of said filament projecting freely therefrom, and means for displacing said head from a filament pickup station to a filament discharge station; a second filament transfer apparatus including a pair of jaws; a third filament transfer apparatus including a finger and means for supporting the body of a filament on the tip thereof; means for displacing said second filament transfer apparatus between cooperative relationship with respect to said first filament transfer apparatus and cooperative relationship with respect to said third filament transfer apparatus; means for actuating said pair of jaws of said second filament transfer apparatus to close on and grip the free leg of a filament supported in a head of said first filament transfer apparatus and to release said filament to said finger of said third filament transfer apparatus with the body of said filament supported on the tip of said finger; and means for displacing said third filament transfer apparatus between filament-receiving relationship with respect to the jaws of said second filament transfer apparatus and filament-presenting relationship with respect to the lead-in wires of a lamp stem.

3. Apparatus for transporting coiled lamp filaments, having a body and a leg extending from each end of said body and substantially parallel to the longitudinal axis thereof, emerging end-on from a filament feeding device, to the lead-in wires of a lamp stem for affixation thereto, said apparatus comprising: a first filament transfer apparatus, disposed in cooperative relationship with respect to said filament feeding device, and including a plurality of heads, means for indexing said heads through a plurality of stations including a filament pickup station and a filament discharge station, and means for drawing a filament into each of said heads and retaining it therein during the travel of each of said heads between said filament pickup station and said filament discharge station; a second filament transfer apparatus including a pair of jaws; a third filament transfer apparatus including a finger and means for supporting the body of a filament on the tip thereof; means for displacing said second filament transfer apparatus between cooperative relationship with respect to said first filament transfer apparatus and cooperative relationship with respect to said third filament transfer apparatus; means for actuating said pair of jaws of said second filament transfer apparatus to close on and grip the free leg of a filament supported in a head of said first filament transfer apparatus and to release said filament to said finger of said third filament transfer apparatus with the body of said filament supported on the tip of said finger; and means for displacing said third filament transfer apparatus between filament-receiving relationship with respect to the jaws of said second filament transfer apparatus and filament-presenting relationship with respect to the lead-in wires of a lamp stem.

References Cited by the Examiner

UNITED STATES PATENTS

| 2,760,679 | 8/56 | Chadderton et al. | 221—225 |
| 2,910,166 | 10/59 | Wiltshire et al. | 198—33.3 |
| 2,915,201 | 12/59 | Calehuff et al. | |
| 2,997,186 | 8/61 | Terez | 214—1 |

HUGO O. SCHULZ, *Primary Examiner.*